United States Patent [19]

Gorse

[11] Patent Number: 5,340,130
[45] Date of Patent: Aug. 23, 1994

[54] POLYVALENT CLAMP CHUCK FOR MACHINE TOOLS

[75] Inventor: Gérard Gorse, Lons-Le-Saunier, France

[73] Assignee: Gerard Gorse Equipements de Machines-Outils S.A., Perrigny, France

[21] Appl. No.: 929,692

[22] Filed: Aug. 12, 1992

[30] Foreign Application Priority Data

Aug. 12, 1991 [FR] France ............... 91 10386

[51] Int. Cl.$^5$ ............... B23B 31/14; B23B 31/16; B23B 31/42
[52] U.S. Cl. ............... 279/110; 279/119; 279/121; 279/130; 279/2.03; 279/123
[58] Field of Search ............... 279/4.02, 4.08, 4.12, 279/121, 143, 144, 110, 111, 118, 119, 120, 4.01, 129–131, 2.02–2.04, 123, 152–154

[56] References Cited

U.S. PATENT DOCUMENTS 2,757,008 7/1956 Lane .
4,403,782 9/1983 Buck .
4,493,041 1/1985 Antoni ............... 279/4.02 X

FOREIGN PATENT DOCUMENTS

| | | |
|---|---|---|
| 0215350 | 3/1987 | European Pat. Off. . |
| 0258771 | 3/1988 | European Pat. Off. . |
| 1284251 | 11/1968 | Fed. Rep. of Germany . |
| 3127486 | 1/1983 | Fed. Rep. of Germany ...... 279/143 |
| 910406 | 6/1946 | France . |
| 2431338 | 2/1980 | France . |
| 2447768 | 8/1980 | France . |
| 628828 | 3/1982 | Switzerland ............ 279/4.02 |
| 1131092 | 10/1968 | United Kingdom . |
| 8807904 | 10/1988 | World Int. Prop. O. ............ 279/143 |

*Primary Examiner*—Steven C. Bishop
*Attorney, Agent, or Firm*—Sandler, Greenblum & Bernstein

[57] ABSTRACT

Polyvalent clamp chuck for machine-tools comprising a cylindrical chuck body in the front face of which are radially guided at least two gripping jaws that can be brought together or separated by drive means by the axial withdrawal or advance of an internal control cylinder concentric with the chuck. The control cylinder is provided at its front end with a connector member, for instance in the form of an inwardly directed gripping flange for additional fitted support means. The coaxial front opening of the chuck has a conical part whose summit is oriented rearwards. The chuck further comprises means for selecting the maximum amplitude of displacement of the control cylinder.

20 Claims, 5 Drawing Sheets

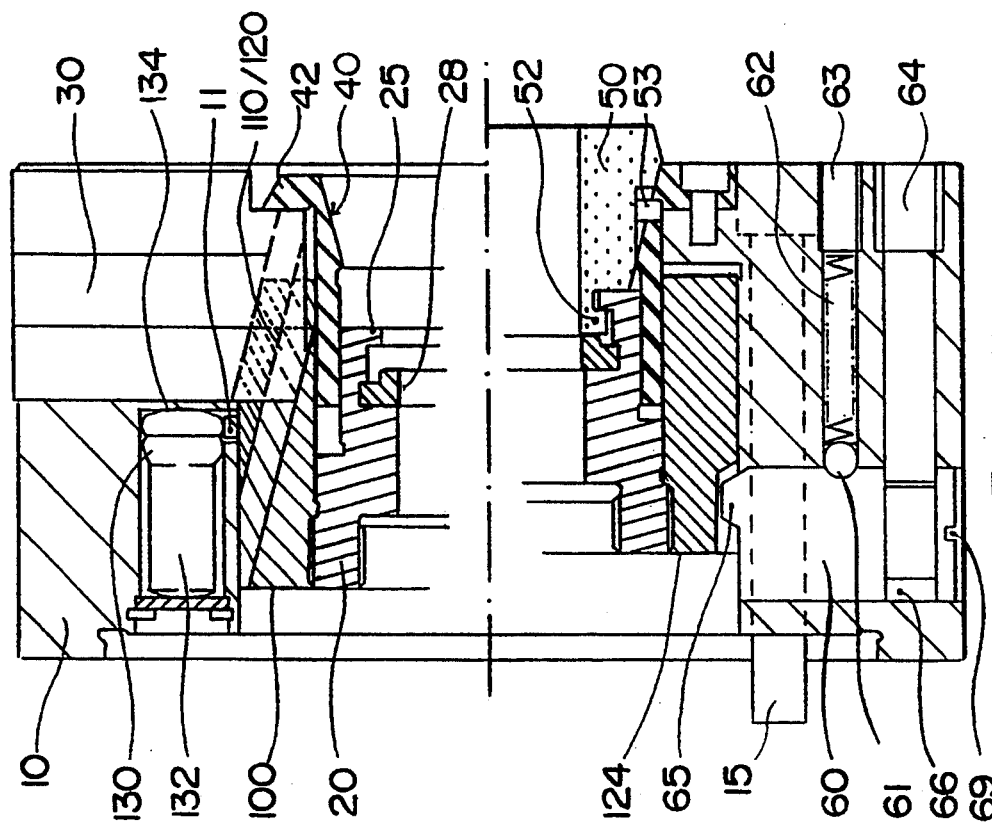
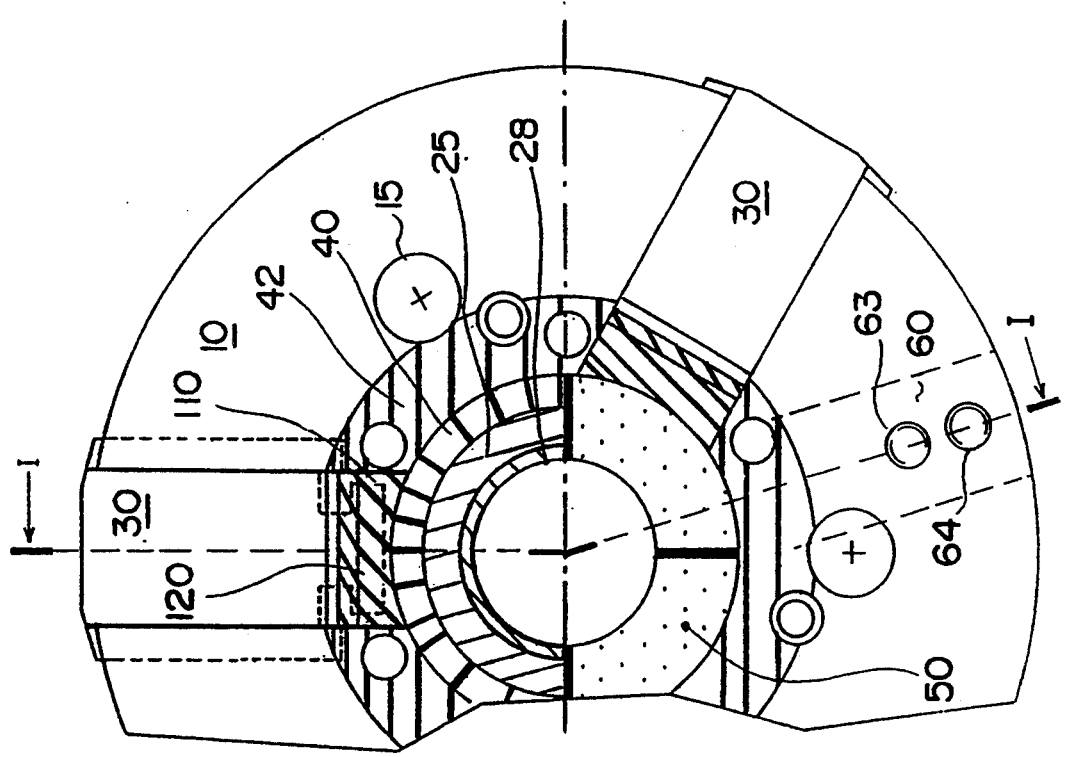

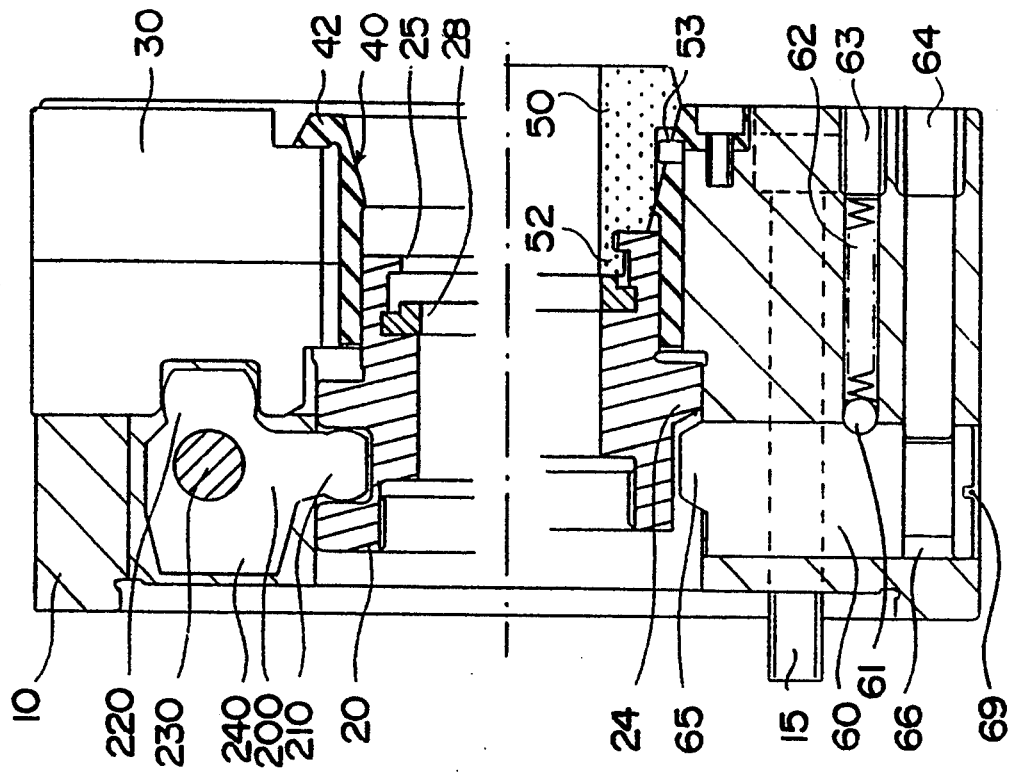
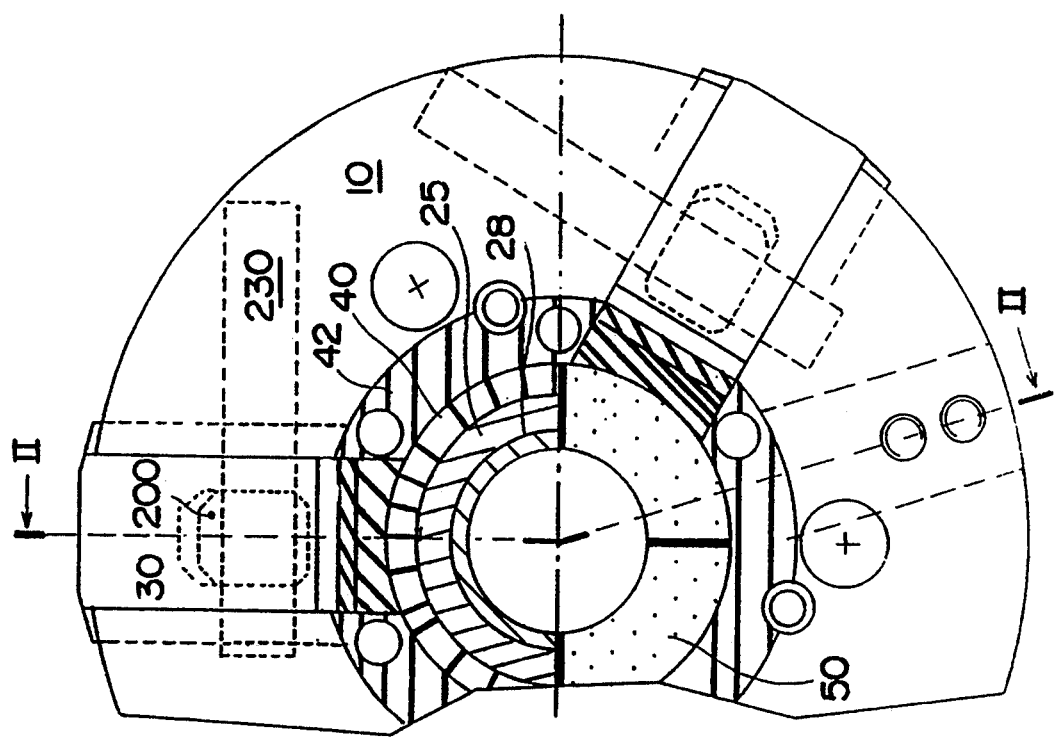

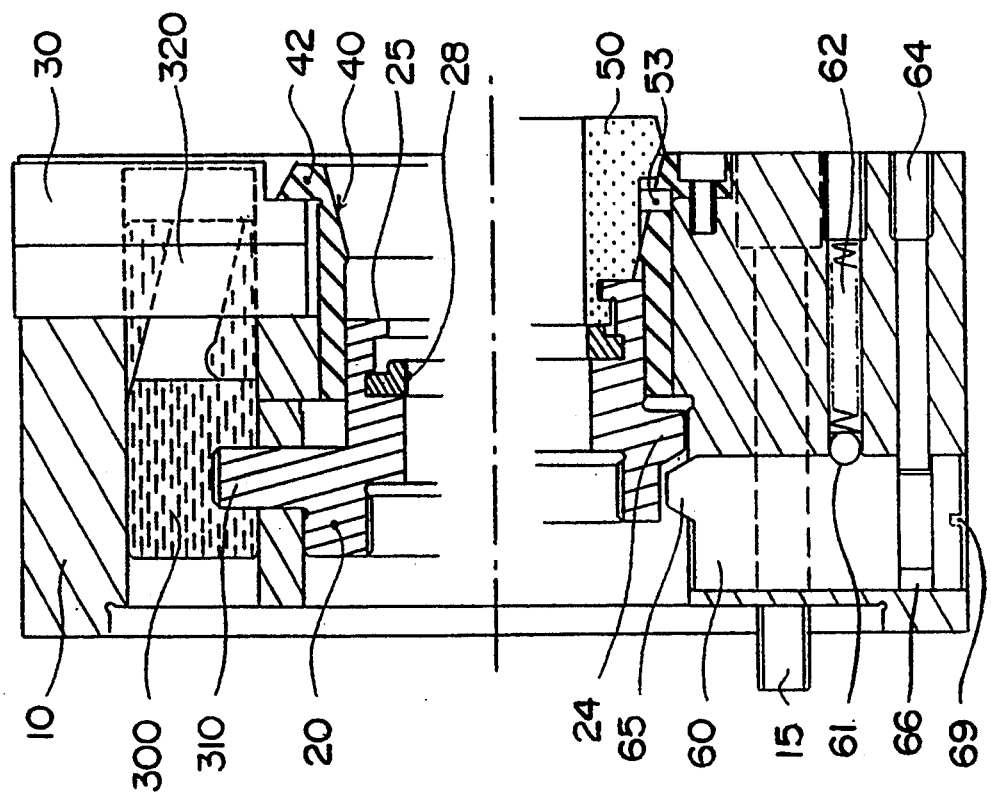
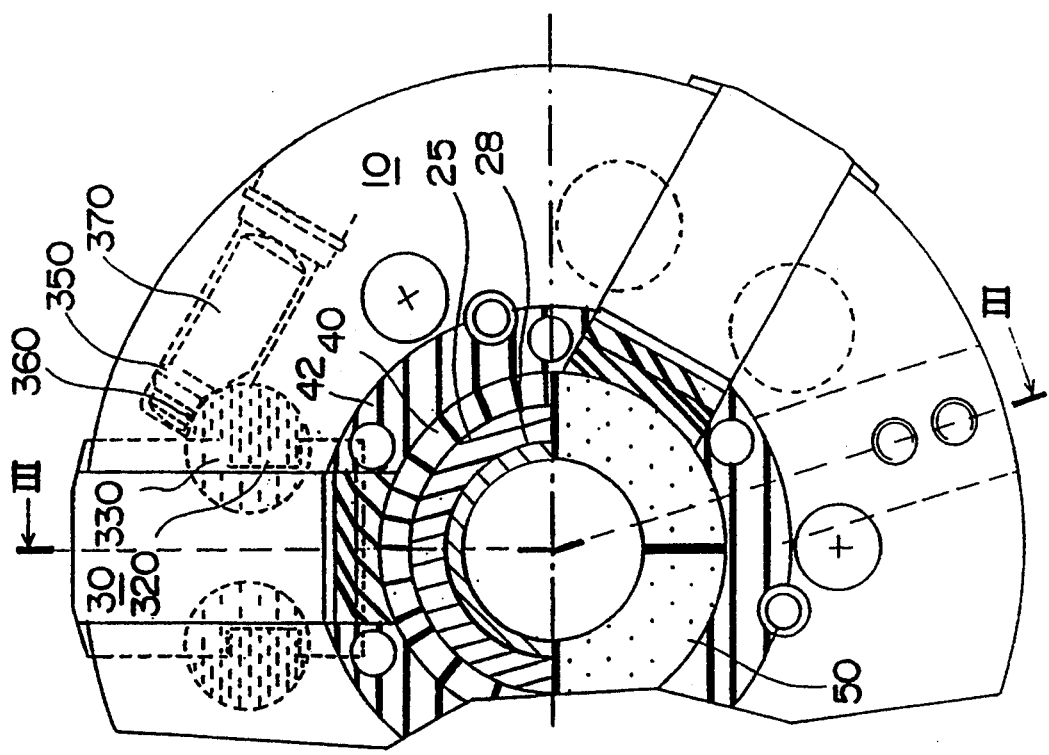
Fig. 3b
Fig. 3a

POLYVALENT CLAMP CHUCK FOR MACHINE TOOLS

BACKGROUND OF THE INVENTION

1. Field of the Invention

The present invention relates to a polyvalent clamp chucks for machine-tools, i.e. a rotating part having retractable jaws able to rigidly hold a workpiece in a very precise position. Numerous types of chuck are already known, each being designed for a specific use.

2. Discussion of Background Information

A first type of chuck has a cylindrical body with two, three, four or six concentric gripping jaws guided radially in its front face. By their design, arrangement and large degree of movement, the jaws of these chucks can grip large workpieces. These jaw-type chucks are differentiated according to the type of drive means provided for radially actuating the jaws in response to axial displacement of a concentric internal control cylinder in the chuck body.

A first kind of jaw-type chuck, the so-called wedge-type, as, for example, described in French patent publication FR-2 447 768, comprises a control cylinder terminating with a sleeve having, facing each jaw, an oblique outwardly-directed wedge in the form of a groove of inverted T cross-section, in which wedge is engaged the rear heel of a main jaw, also of T shape. As the main jaw is mobile only radially in the front face of the chuck body, it is easily understood that when the control cylinder is withdrawn, the lower part of the sleeve's wedge causes lowering of the jaw's correction heel. FR-2 431 338 describes a device for compensating for centrifugal force for this wedge-type of chuck, comprising a lever situated to the rear of and perpendicular to the jaw, with a short arm bearing in a recess in the rear face of the jaw and a longer arm that is pulled outwards by an inertia block under the action of centrifugal force.

In a second kind of jaw-type chuck, the so-called sliding block chuck, such as that described in European patent publication EP-0 215 350, the main jaw is engaged on one side (or on both sides) by an oblique tenon and mortice coupling with a part sliding parallel to the chuck axis, this block being actuated by a rear control cylinder also via a tenon and mortice coupling. To avoid jamming effects, the tenon and mortice coupling between the sliding block and the main jaw may have a trapezoidal cross-section. Alternatively, the oblique coupling of jaws/sliding block may also be provided by a series of parallel, oblique and interpenetrating toothings.

Another jaw-type chuck of the so-called lever type, such as that sold by Messrs GAMET under reference "MX", comprises a lever for each jaw, situated in the radial plane passing through the jaw, with a short arm engaged in a recess provided in the jaw's rear face, and a longer arm at right angles to the other, that engages in a recess provided in the external face of the control cylinder. Thus, by withdrawing the control cylinder, the short arms are caused to move down, thus bringing the jaws together. Advantageously, one or all of the levers further comprises, in extension of their short arm and beyond the pivot, an inertia block that enhances gripping of the jaws under the action of centrifugal force.

A second general type of chuck of the so-called pincer-clamp type, such as that described in European patent publication EP-0 258 771, comprises several pincers in the form of segments of a hollow truncated cone, whose external surfaces come to bear in an also-conical fixed part of the chuck body. The ends of these pincers are provided with hooks by means of which they can be pulled by the control cylinder towards the inside of the fixed conical part of the chuck. This type of chuck is more particularly designed for machining workpieces from bars or parts of medium dimensions requiring uniform gripping over a large surface.

Another general type of chuck, the so-called "front-driving" type, comprises a coaxial body whose end is fitted centrally with a centering point and, adjacent to this point, a series of radial driving knives. The centering point may be fixed with the mobile driving knives driven by a rearwardly-located jack, or vice versa. Cooperating with a similar facing body, these parts are designed to grip by its lateral faces a workpiece to be machined over its entire external surface. Frequently, these chucks are mounted on a jaw-type chuck, either by being directly fixed against the flat front face by bolts, or by being gripped in the jaws themselves. However, the centering of this fitted jaw may create some difficulties, which may slow down the installation operation.

Another general type of chuck, the so called expansible type, comprises a body fitted against the chuck's front face. An external part of this body can expand, or an internal part can contract, under the action of a displaceable control body or under the action of hydraulic pressure, so as to seize a workpiece to be machined on its external surface.

A first type of expansible mechanical chuck comprises a simple external cone forming an integral part of the basic body and over which a slit part is pushed or pulled, according to the inclination of the cone. The converse arrangement can also be envisaged, namely a fixed pincer with an inner cone that is pushed or pulled.

A second type of expansible mechanical chuck of the so-called "double cone" type comprises a pincer gripped between a conical part of a main body and a second mobile conical part situated at the end of a pull-piece. By pulling the pull-piece, thus bringing the two conical parts towards one another, it is possible to radially displace the pincers so they can grip from the inside a hollow part to be machined on its outer surface.

A third type of expansible mechanical chuck comprises, also in a fitted body, an elastic membrane deformed by hydraulic pressure produced by displacement of a piston in a cylinder integrated in the fitted body, which piston is manually or automatically actuated by a jack.

From the above, it can be understood that a mechanic's workshop having to machine numerous small series of different parts, as, for instance, is usual for subcontractor's workshops, must imperatively be equipped with several types of chuck, which requires a large investment.

Moreover, changing from one type of chuck to another is often long and intricate, and increases the dead time between production runs. Furthermore, it would be possible to allow entirely automatic machines to run continuously, even when the operator is absent during breaks, the workpieces being loaded and unloaded by the machine as long as no manual adjustment is required when passing from machining with orthogonal jaws to machining with oblique jaws, or vice versa.

Lastly, upon each change of the clamping chuck, the position of the gripping jaws on the main jaws must accordingly be set to a procedure that may vary from one chuck manufacturer to another.

SUMMARY OF THE INVENTION

An object of the present invention is to obviate the aforementioned problems by means of a chuck with a single base that can be transformed for use either with orthogonal jaws or with oblique jaws, or be completed to form one of the aforementioned front driving gripping types or the expansible type. The design of such a basic chuck must enable these modifications to be made easily and hence rapidly and with a minimum of intermediate parts or with none at all.

These objects are achieved according to the invention by means of a polyvalent clamp chuck for machine-tools comprising a cylindrical chuck body in the front face of which are radially guided at least two gripping jaws that can be brought together or separated by drive means by the axial withdrawal or advance of an internal control cylinder concentric with the chuck, due to the fact that the coaxial front opening of the chuck has a conical part whose summit is oriented rearwards; the fact that the control cylinder is provided at its front end with a connector member for additional fitted support means coacting with the conical part of the front opening; and the fact that the chuck further comprises means for selecting the maximum-amplitude of displacement of the control cylinder. The connector member may advantageously be made up of an inwardly-directed hook-shaped flange that terminates the end of the control cylinder.

Advantageously, the means for selecting the maximum amplitude of displacement of the control cylinder comprise a cylindrical part fitted in a radial orifice of the chuck body, the inner end of the part carrying an eccentric abutment situated at the level of a corresponding abutment provided on the external face of the control cylinder, or on the external face of a member of the drive means, the outer end of the part comprising means enabling it to be turned at will about its axis. Said part may be held in position by a bar engaged in a transverse groove. The angular position of this part may be indexed by a ball pushed by biasing means engaging in corresponding recesses provided on the periphery of the part.

According to a first variation, the additional support means are internal gripping pincers in the form of longitudinal segments of a truncated hollow cone whose external conical faces come to bear against the conical part of the chuck's front opening, and whose summits are provided with one or more additional elements for connecting with the connector member located at the end of the control cylinder. Advantageously, in this case the selection means are in the "minimum displacement" position. For example, the summits of the internal gripping pincers may be provided with hooks engaging in the corresponding front flange of the control cylinder.

According to a second variation of the invention, the additional support means is a point-type front drive whose rear face has a conical protuberance which for centering comes to be lodged in the conical part of the chuck's front opening, this drive being fixed to the front face of the chuck by bolts, nuts, tie pieces or any other means.

According to a third variation, the additional support means is a mechanical chuck expansible by withdrawal of an inner pull-piece. A conical centering part of the rear face of the fitted body comes to bear in the conical part of the chuck's front opening. The rear end of the pull-piece may be solidly fixed with an expansion-control crown provided with part-spiral grooves respectively piloting a pin protruding from a slide that is mobile only in the radial direction in a guiding coupling sleeve adjacent the crown. This sleeve is held close to the crown by a first connection with the pull-piece and is restrained from rotation by a second connection with the additional fixed body. Thus, by rotation imparted to the pull-piece, it is possible to make the slides move out to become engaged behind a connecting member of the control cylinder, for example a hook-form flange located at the end of the control cylinder. Advantageously, in this case the selection means are in the "minimum displacement" position.

When the means for driving the jaws is of the so-called wedge type, the external face of the control cylinder has at its rear end a mechanical connection with a cylindrical ring inserted above the cylinder, this ring having, in front of each jaw, a ramp in the shape of an inverted T-shaped groove receiving therein a T-shaped tenon situated on the base of the corresponding jaw. Advantageously, to facilitate assembly, the mechanical connection between the control cylinder and the ring is provided by threading.

When the jaw drive means is of the sliding block, at least one of the blocks may be locked in the gripping position by a lever situated in a plane parallel to the front surface, the lever having a long arm formed as an inertia block, and a short arm bearing against the sliding block when the inertia block is deviated by centrifugal force produced by rotation of the chuck.

Usefully, the gripping jaws fitted on the main jaws are provided with an abutment for locking them in position, in the form of an elbow rod engaged in an orifice or a groove of the gripping jaw and locked in a selected position by means of a transverse screw.

BRIEF DESCRIPTION OF THE DRAWINGS

The invention will be better understood by studying embodiments given by way of non-limiting example and illustrated in the accompanying drawings, in which:

FIGS. 1a and 1b illustrate a wedge type chuck according to the invention, respectively, in front view and in cross-section along line I—I of FIG. 1a;

FIGS. 2a and 2b illustrate a lever type chuck according to the invention, respectively, in front view and in cross-section along line II—II of FIG. 2a;

FIGS. 3a and 3b illustrate a sliding block type chuck according to the invention, respectively, in front view and in cross-section along line III—III of FIG. 3a;

DETAILED DESCRIPTION OF THE PREFERRED EMBODIMENTS

Figure 4:
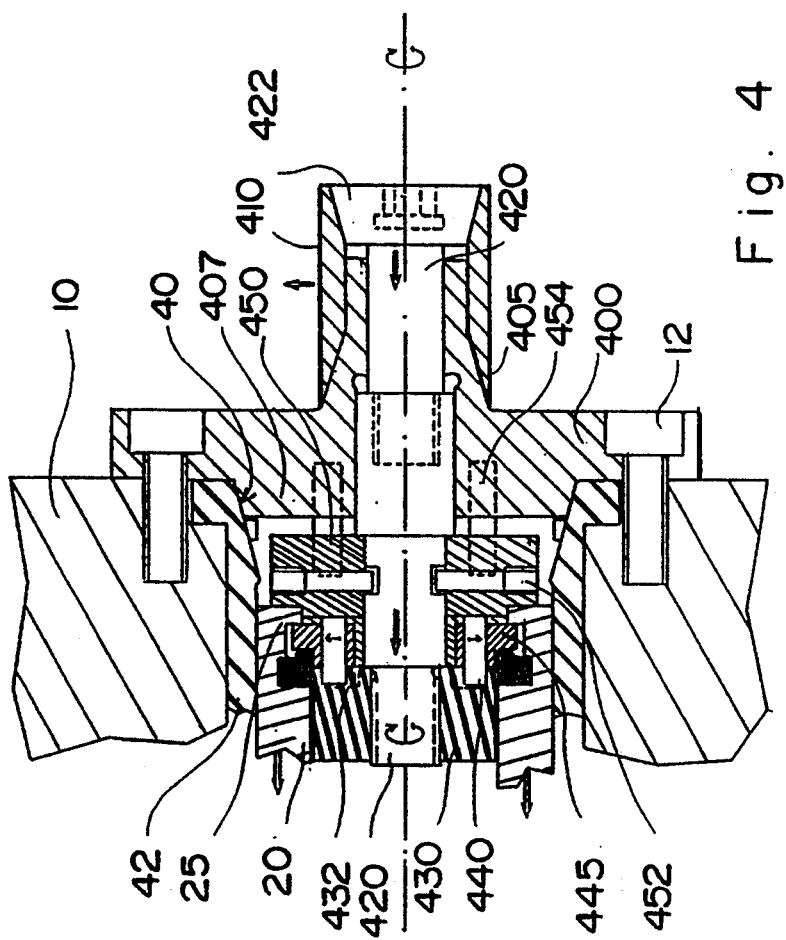
FIG. 4 illustrates in cross-section an expansible mechanical chuck specially adapted for the basic chuck according to the invention.

In the drawings, parts having a similar function, even though their structure may be slightly different, are designated by the same numerals and are shown with similar hatching. Moreover, "frontal" will be used to designate a part oriented towards the chuck mouth where a workpiece is gripped, and conversely "rear" will be used to designate a part of the chuck adjacent the machine-tool. Likewise, "interior" will designate a part facing towards the longitudinal axis of the chuck, and conversely "exterior" will designate a part oriented radially towards the chuck's periphery.

With reference to FIGS. 1a and 1b, the chuck comprises a generally cylindrical body 10 secured to the machine-tool by several large bolts 15. In the front face are three equidistant radial grooves of T-shaped section in which the main jaws 30 can move radially. The mouth of the frontal concentric opening of the chuck is fitted with an external collar of a sleeve 42 whose cylindrical part penetrates up to about half-way along the chuck body. Specifically, at this front opening the sleeve 42 has a conical part 40 whose summit is oriented towards the inside of the chuck.

Inside this sleeve 42 is engaged the front end of a control cylinder 20 having on the inner edge of its rear end a threading for connection with a push or pull rod of the machine tool. The front end of this control cylinder is completed with an inwardly-facing flange 25.

As can best be seen on the lower part of FIG. 1b, through the chuck body 10 extends a cylindrical part 60 whose inner end has an eccentric abutment 65. This part 60 is held in place by means of a rod 64 one end of which is threaded for securing in the chuck body and the other end engages in a circular groove 66 provided in part 60. Moreover, a ball 61, urged by a spring 62 that applies against a closure screw 63, temporarily keeps the cylindrical part 60 in its angular position. The external surface of this part 60 also has a slot 69 enabling it to be turned by means of a screwdriver or any other suitable means such as a button. As can easily be understood, the abutment 65 is located more or less forward in the chuck body after this cylindrical part 60 has been turned by half a turn.

The previously described parts make up the basic components of the chuck according to the invention, i.e., those parts which are always present whatever be the mode of gripping of the jaws or the model of chuck used.

The jaw-type chuck illustrated in FIGS. 1a and 1b comprises more particularly a sleeve 100 engaged around the control cylinder 20 to which it is connected by a threading on its rear part. Other mechanical securing means, such as, for example, pins may also be used. This sleeve 100 has, facing each main jaw 30, an oblique ramp 110 of inverted T section. In these oblique ramps are engaged respective flanges 120, also T shaped, of the main jaws 30.

Above the sleeve 100 is fitted a device for compensating centrifugal force, formed of a substantially rectilinear lever 130 oriented parallel to the chuck axis, its rear branch 132 forming an inertia block and its rounded front protuberance 134 forming a bearing arm on the sleeve 100 via a slotted part 11 of the chuck body 10. The inertia block 132 is accessible through the rear by removing a cover plate held by a spring clip.

In this configuration, the path-limiting abutment 65 acts against a corresponding shoulder 124 provided on the periphery of sleeve 100.

For use of the "pincer grip" type, pincers 50 are fitted by firstly engaging their hooked ends 52 behind the flange 25, and then fitting the conical external surface of this pincer against the conical part 40 of sleeve 42.

Then, withdrawal of the control cylinder 20 produces upward movement of the pincer 50 along the conical part 40, thus producing a concentric gripping all along its inner surface. A pin 53 connects the driving chuck body for rotation with the driven pincers. This pin could be replaced by complementary grooves parallel to the chuck axis and located both on the external surfaces of the pincers and on the conical part 40. If desired, an anti-cutting O-ring 28 can be previously fitted behind flange 25.

The control cylinder 20 can be connected to the pincers 50 also by other securing means such as hooks in slot-like openings, or bayonnet-type fixtures, or by threading.

A point type frontal drive used with the chuck according to the invention is preferably completed with a conical protuberance on its rear face enabling the conical part to be used to advantage to center the drive before securing it. This drive is most usually secured by means of bolts passing through its front face, but can also be secured by means of flanges fixed on its front face, or by other means. In relation to the chuck of the invention, it is also possible to design a rear extension on the drive provided at its end with retractable radial tongues that can be fitted at will behind the flange 25 once this extension has been inserted in the chuck body.

If a traction function is not required for holding the drive, the control cylinder 20 may be used as pusher for the point or for axially mobile knives.

In FIGS. 2a and 2b, first of all the basic components can be recognized, namely: the chuck body 10 whose front opening fitted with the sleeve 42 and its conical part 40, the control cylinder 20 terminating with its front flange 25, as well as the devices for selecting the position of the abutment 65 for limiting the path of cylinder 20.

However, in this instance the main jaws 30 are brought together by means of a lever 200 pivoting about an axis 230, there being a short arm 220 engaged in a recess provided in the rear face of jaw 30, and an arm 210 engaged in a circular groove of the control cylinder 20. To compensate releasing forces due to centrifugal force, an inertia block 240 is provided on the rear part of lever 200.

With reference to FIGS. 3a and 3b, the bringing together of the main jaws 30 takes place by means of a sliding block 300 having an oblique lateral tenon 320 that penetrates in a corresponding groove 330 of the lateral face of this main jaw 30. The control cylinder 20 is furthermore connected to the interior base of the sliding blocks 300 by tenons 310 penetrating in corresponding grooves.

More particularly, the device for compensating for centrifugal force here comprises a lever 350 arranged in the plane of the chuck, level with the connection of tenon-groove 310. It can readily be understood that the centrifugal force tends to shift the inertia block 370 radially outwards thus causing the short arm 360 to bear against the corresponding sliding block 300 thereby blocking it in position.

In FIG. 4 is shown a chuck with expandable jaws acting on double inverted cones, comprising firstly a fitted body 400 applied against the front face of the chuck body 10 and centered by means of-a conical protruding part 407 of its rear face which comes to fit in the conical part 40 of sleeve 42. This fitted body 400 is fixed to the chuck body by a series of bolts 12 or any other usual means. The front face of the fitted body 400 has a first conical part 405 extended by a cylindrical part above which are fitted expandable gripping jaws 410. These gripping jaws are held in position by the conical end 422 of a pull-piece 420 passing through the entire fitted body 400 and whose rear end comes level with the control cylinder 20.

The rear end of this push-piece 420 is solidly fixed to a crown 430 by threading, or possibly by means of a pin. On its front face, this crown 430 has grooves formed as spiral portions. Immediately following this crown is located a coupling sleeve 450 connected to the pull-piece 420 by screws 452 penetrating into grooves. However, the coupling sleeve 450 is prevented from rotating by pins 454 anchored in the fitted body 400. In the rear face of this coupling sleeve are provided several radial grooves receiving therein slides 445 through which pass pins 440 that penetrate in the part-spiral grooves 432.

As can readily be understood, the rear part of the expandable chuck is inserted in the basic chuck until the fitted body 400 is applied against the front surface to which it is screwed. The pull-piece is then turned about itself which, by rotation of the crown 430, produces an outward movement of the slides which come to engage behind the flange 25 of the control pull-piece 20. This rotation of the pull-piece can be produced, for example, by means of a hexagonal key inserted in a hexagonal orifice provided at the front end of this pull-piece. Withdrawal of the control cylinder 20 then produces withdrawal of the pull-piece 420 through the slides and through the crown, which causes moving out of the gripping jaws 410 by pinching between the two opposed conical parts 405 and 422.

The principle of the previously-described adaptor device is equally suitable for other chucks having a simple conicity with pull-out end pincers (or cone). For chucks with push-type cones (or pincers), it is however possible to directly use the control cylinder 20 provided with an adaptor for advancing the workpiece. As before, the body of these chucks always remains centered relative to the chuck by means of the conical part of sleeve 42.

Figure 5A:
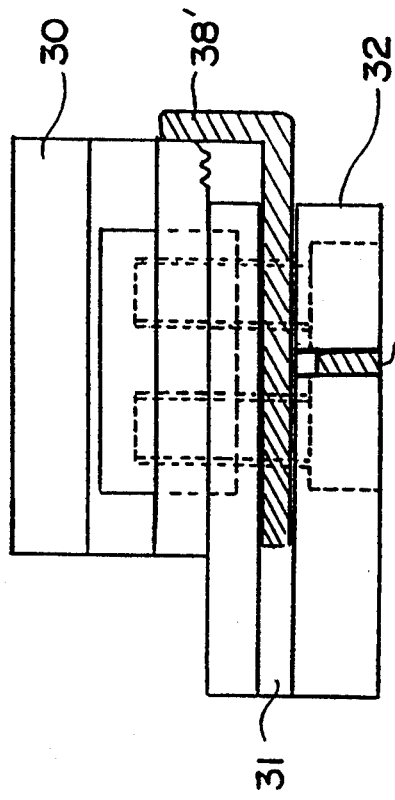
FIGS. 5a and 5b illustrate a first variation for securing gripping jaws onto main jaws.
Figure 5B:
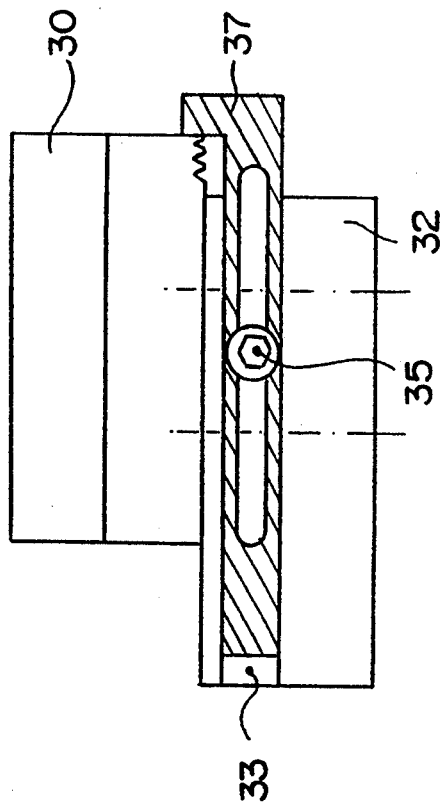
Figure 6A:
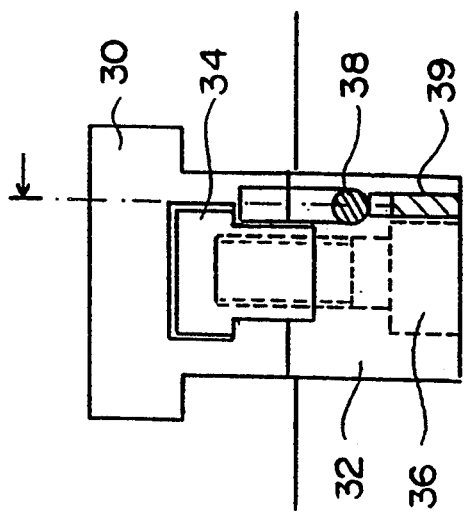
FIGS. 6a and 6b illustrate a second variation for securing gripping jaws onto main jaws.
Figure 6B:
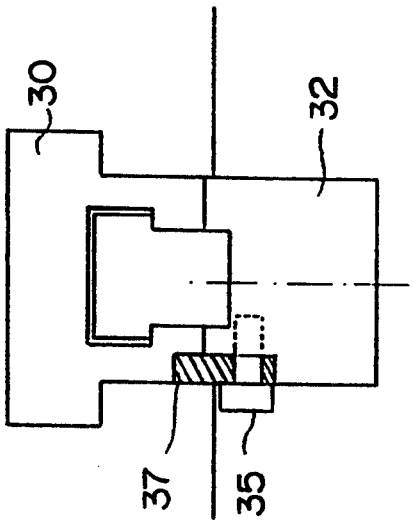

FIGS. 5 and 6 illustrate manners of securing the gripping jaws 32 on a main jaw 30 via an intermediate part 34 receiving gripping bolts. To facilitate exact positioning of the gripping jaws on the main jaws, in the gripping jaws an additional adjustable abutment is provided.

As illustrated in FIGS. 6(a) and (6b), the abutment 37 may be situated at the end of a rod of rectangular cross-section fitted in a lateral groove, which rod is fixed by means of a screw 35. Alternatively, and as illustrated in FIGS. 5(a) and 5(b), the abutment 38' in the form of a bar or a disc is mounted on the end of a cylindrical rod 38 inserted in a corresponding orifice 31 and locked by a transverse screw 39.

As can be gathered from the description, by means of this control cylinder 20 of particular shape and partly conical at the front opening, the chuck of the invention can provide several gripping modes on one and the same chuck. Numerous improvements may be made to this chuck within the scope of this invention.

I claim:

1. A polyvalent clamp chuck for machine-tools, comprising:

a cylindrical chuck body having a coaxial front opening in a front face;

at least two movable, radially guided gripping jaws positioned in said front opening;

an internal control cylinder concentrically arranged with said chuck body, and positioned to be axially movable to move said at least two movable gripping jaws towards or away from each other, said control cylinder comprising, at a front end, a connector member;

drive means for axially moving said control cylinder;

a sleeve having a conical portion, said sleeve being associated with said front opening so that said conical portion is outwardly sloping forming an opening which widens in a direction from inside said cylindrical chuck body towards the front face;

fitted support means for coacting with said conical portion and said connector member; and means for selecting maximum amplitude of displacement of said control cylinder.

2. The polyvalent clamp chuck for machine-tools according to claim 1, wherein said connector member comprises an inwardly-directed hook-shaped flange forming an end of said control cylinder.

3. The polyvalent clamp chuck for machine-tools according to claim 1, wherein said means for selecting maximum amplitude of displacement of said control cylinder comprise:

a cylindrical part fitted in a radial orifice of said chuck body, said cylindrical part comprising an inner end carrying an eccentric abutment and a periphery including recesses;

a corresponding abutment in an external face of said control cylinder or on an external face of said drive means;

said cylindrical part being rotatable around an axis, and comprising an outer end including means for enabling said cylindrical part to be rotated around the axis;

a bar engaged in a transverse groove for holding said cylindrical part in position;

a ball and biasing means for pushing said ball into a corresponding recess of said recesses for indexing angular positioning of said cylindrical part.

4. The polyvalent clamp chuck for machine-tools according to claim 1, wherein said fitted support means comprise internal gripping pinchers comprising longitudinal portions of a truncated hollow cone including external conical faces bearing against said conical portion; said internal gripping pinchers including, on an internal portion, at least one element for connecting with said connector member; and said means for selecting maximum amplitude are set to provide for minimum displacement of said control cylinder.

5. The polyvalent clamp chuck for machine-tools according to claim 2, wherein said fitted support means comprise internal gripping pinchers comprising longitudinal portions of a truncated hollow cone including external conical faces bearing against said conical portion; said internal gripping pinchers including, on an internal portion, at least one element for connecting with said connector member; and said means for selecting maximum amplitude are set to provide for minimum displacement of said control cylinder.

6. The polyvalent clamp chuck for machine-tools according to claim 1, wherein said fitted support means comprise a point-type front drive including a rear face having a conical protuberance positionable in said conical portion for centering the front drive, and elements for fixing the front drive to the front face of said chuck body.

7. The polyvalent clamp chuck for machine-tools according to claim 2, wherein said fitted support means comprise a point-type front drive including a rear face having a conical protuberance positionable in said conical portion for centering the front drive, and elements for fixing the front drive to the front face of said chuck body.

8. The polyvalent clamp chuck for machine-tools according to claim 1, wherein said fitted support means comprise a mechanical chuck connected with and expansible by withdrawal of an inner pull-piece; a retractable connector member for hookably engaging a rear end of said inner-pull piece in said connector member; a fitted body comprising a conical centering part positioned in said conical portion; and said means for selecting maximum amplitude are set to provide for minimum displacement of said control cylinder.

9. The polyvalent clamp chuck for machine-tools according to claim 2, wherein said fitted support means comprise a mechanical chuck connected with and expansible by withdrawal of an inner pull-piece; a retractable connector member for hookably engaging a rear end of said inner-pull piece in said connector member; a fitted body comprising a conical centering part positioned in said conical portion; and said means for selecting maximum amplitude are set to provide for minimum displacement of said control cylinder.

10. The polyvalent clamp chuck for machine-tools according to claim 8, wherein said retractable connection means comprise a rotatable expansible control crown fixed with said rear end of said pull-piece, said control crown comprising spiral grooves for respectively piloting a pin; a plurality of pins and slides, each pin protruding from a slide, said slides being movable only in a radial direction in a guide coupling sleeve which is adjacent to said control crown and connected to a fitted body; and said slides being capable of contacting a rear portion of said connector member.

11. The polyvalent clamp chuck for machine-tools according to claim 9, wherein said retractable connection means comprise a rotatable expansible control crown fixed with said rear end of said pull-piece, said control crown comprising spiral grooves for respectively piloting a pin; a plurality of pins and slides, each pin protruding from a slide, said slides being movable only in a radial direction in a guide coupling sleeve which is adjacent to said control crown and connected to a fitted body; and said slides being capable of contacting a rear portion of said connector member.

12. The polyvalent clamp chuck for machine-tools according to claim 1, wherein said drive means comprise a wedge drive mechanism including a cylindrical ring engaged around said control cylinder, said cylindrical ring comprising, in front of each jaw of said at least two gripping jaws, a ramp comprising an inverted T groove shape, and a T-shaped tenon positioned in said T groove shape and connected with a respective jaw.

13. The polyvalent clamp chuck for machine-tools according to claim 12, wherein said cylindrical ring is mechanically connected to a rear portion of said control cylinder.

14. The polyvalent clamp chuck for machine-tools according to claim 13, wherein the mechanical connection comprises threading.

15. The polyvalent clamp chuck for machine-tools according to claim 2, wherein said drive means comprise a wedge drive mechanism including a cylindrical ring engaged around said control cylinder, said cylindrical ring comprising, in front of each jaw of said at least two gripping jaws, a ramp comprising an inverted T groove shape, and a T-shaped tenon positioned in said T groove shape and connected with a respective jaw.

16. The polyvalent clamp chuck for machine-tools according to claim 15, wherein said cylindrical ring is mechanically connected to a rear portion of said control cylinder.

17. The polyvalent clamp chuck for machine-tools according to claim 1, wherein said drive means comprise a lever drive mechanism.

18. The polyvalent clamp chuck for machine-tools according to claim 1, wherein said drive means comprise a sliding block drive mechanism including a plurality of sliding blocks; a lever positioned in a plane parallel to a plane passing through the front face of said chuck body for locking at least one of said sliding blocks in a gripping position; said lever comprising a long arm defining an inertia block and a short arm bearing against said at least one block when said long arm defining the inertia block is deviated by centrifugal force produced by rotation of said chuck body.

19. The polyvalent clamp chuck for machine-tools according to claim 1, comprising at least two main jaws and said at least two gripping jaws are fitted on said at least two main jaws; and an abutment associated with each gripping jaw for locking the gripping jaw in position, said abutment comprising an elbow rod engaged in an orifice of said gripping jaw, and a transverse screw for locking said elbow rod in a selected position.

20. The polyvalent clamp chuck for machine-tools according to claim 2, comprising at least two main jaws and said at least two gripping jaws are fitted on said at least two main jaws; and an abutment associated with each gripping jaw for locking the gripping jaw in position, said abutment comprising an elbow rod engaged in an orifice of said gripping jaw, and a transverse screw for locking said elbow rod in a selected position.

* * * * *